United States Patent
Kurakane et al.

(10) Patent No.: US 10,290,849 B2
(45) Date of Patent: May 14, 2019

(54) LAMINATED POROUS FILM AND NON-AQUEOUS ELECTROLYTE SECONDARY CELL

(71) Applicant: Sumitomo Chemical Company, Limited, Tokyo (JP)

(72) Inventors: Kosuke Kurakane, Osaka (JP); Chikara Murakami, Osaka (JP); Takahiro Okugawa, Niihama (JP); Yutaka Suzuki, Tsukuba (JP); Tomoaki Ozeki, Niihama (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 0 days.

(21) Appl. No.: 15/119,232

(22) PCT Filed: Feb. 6, 2015

(86) PCT No.: PCT/JP2015/054048
§ 371 (c)(1),
(2) Date: Aug. 16, 2016

(87) PCT Pub. No.: WO2015/125712
PCT Pub. Date: Aug. 27, 2015

(65) Prior Publication Data
US 2017/0040584 A1    Feb. 9, 2017

(30) Foreign Application Priority Data

Feb. 18, 2014  (JP) .................................. 2014-028206

(51) Int. Cl.
| | | |
|---|---|---|
| *H01M 2/16* | (2006.01) | |
| *H01M 2/34* | (2006.01) | |
| *H01M 10/0525* | (2010.01) | |
| *H01M 10/052* | (2010.01) | |

(52) U.S. Cl.
CPC ....... *H01M 2/1686* (2013.01); *H01M 2/1653* (2013.01); *H01M 2/348* (2013.01); *H01M 10/0525* (2013.01); *H01M 10/052* (2013.01); *H01M 2200/10* (2013.01)

(58) Field of Classification Search
CPC .......................... H01M 2/1686; H01M 2/1653
See application file for complete search history.

(56) References Cited

U.S. PATENT DOCUMENTS

| | | | | |
|---|---|---|---|---|
| 2002/0127473 A1* | 9/2002 | Ooya | ..................... | H01M 4/131 429/232 |
| 2002/0146623 A1* | 10/2002 | Suzuki | .................. | H01M 4/134 429/218.1 |
| 2002/0192549 A1* | 12/2002 | Maruyama | ............ | H01M 2/145 429/217 |
| 2003/0198870 A1* | 10/2003 | Wariishi | .............. | H01M 4/5815 429/313 |
| 2006/0286439 A1* | 12/2006 | Fujikawa | ............ | H01M 2/1653 429/62 |
| 2007/0281206 A1 | 12/2007 | Fujikawa et al. | | |
| 2010/0178544 A1 | 7/2010 | Nishikawa | | |
| 2011/0171513 A1* | 7/2011 | Kuze | .................... | H01M 10/054 429/144 |
| 2013/0216893 A1 | 8/2013 | Ueki et al. | | |
| 2013/0273408 A1 | 10/2013 | Yoshitomi et al. | | |
| 2014/0113173 A1 | 4/2014 | Honda et al. | | |
| 2014/0178741 A1 | 6/2014 | Hasegawa et al. | | |
| 2015/0050545 A1 | 2/2015 | Murata et al. | | |
| 2015/0056517 A1* | 2/2015 | Zhou | ................. | H01M 10/0525 429/310 |
| 2017/0040584 A1* | 2/2017 | Kurakane | ........... | H01M 2/1653 |
| 2017/0194612 A1 | 7/2017 | Murata et al. | | |
| 2017/0194613 A1 | 7/2017 | Murata et al. | | |
| 2017/0279102 A1 | 9/2017 | Hasegawa et al. | | |
| 2018/0083249 A1 | 3/2018 | Hasegawa et al. | | |

FOREIGN PATENT DOCUMENTS

| | | |
|---|---|---|
| JP | H11 102683 A | 4/1999 |
| JP | 2004227972 A | 8/2004 |
| JP | 2007324073 A | 12/2007 |
| JP | 2012226921 A | 11/2012 |
| JP | 2013-012351 A | 1/2013 |
| JP | 5172047 B2 | 3/2013 |
| JP | 201346998 | 3/2013 |

(Continued)

OTHER PUBLICATIONS

Int'l Search Report dated May 19, 2015 in Int'l Application No. PCT/JP2015/054048.
Int'l Preliminary Report on Patentability dated Aug. 23, 2016 in Int'l Application No. PCT/JP2015/054048.
Office Action dated Apr. 28, 2018 in CN Application No. 201580008851.3.
Office Action issued Dec. 4, 2018 in JP 2016-080089 (Partial English Translation).

(Continued)

*Primary Examiner* — Sarah A. Slifka
*Assistant Examiner* — Brian R Ohara
(74) *Attorney, Agent, or Firm* — Panitch Schwarze Belisario & Nadel LLP

(57) ABSTRACT

A laminated porous film, including: a porous layer containing a polyolefin; and a porous layer containing a heat-resistant material and provided on at least one surface of the porous layer containing the polyolefin, the laminated porous film satisfying Formula (I) below, $$0.1136 \times \alpha + 0.0819 \times \beta + 3.8034 \geq 4.40 \qquad (I),$$

where α is a value of a film resistance ($\Omega \cdot cm^2$) of the laminated porous film, and β is a value of a volume ($cc/m^2$) of the heat-resistant material contained per 1 $m^2$ of the porous layer containing the heat-resistant material.

4 Claims, No Drawings

(56) References Cited

FOREIGN PATENT DOCUMENTS

| WO | 2008149895 | A1 | 12/2008 |
| WO | 2012049748 | A1 | 4/2012 |
| WO | 2013147071 | | 3/2013 |

OTHER PUBLICATIONS

Office Action issued Mar. 19, 2019 in JP Application No. 2016-080089 (Partial English Translation).

* cited by examiner

LAMINATED POROUS FILM AND NON-AQUEOUS ELECTROLYTE SECONDARY CELL

CROSS-REFERENCE TO RELATE. APPLICATION

This application is a Section 371 of International Application No. PCT/JP2015/054048, filed Feb. 6, 2015, which was published in the Japanese language on Aug. 27, 2015, under International Publication No. WO 2015/125712 A1, and the disclosure of which is incorporated herein by reference.

TECHNICAL FIELD

The present invention relates to a laminated porous film. Further, the present invention relates to a nonaqueous electrolyte secondary battery including the above laminated porous film.

BACKGROUND ART

A nonaqueous electrolyte secondary battery, typically a lithium ion secondary battery, has a high energy density, and thus lets a large current flow and generates heat intensely in a case where a breakage of the battery, for example, penetration of a foreign body (typically, a nail penetration test), has caused an internal short circuit.

There is thus a demand that a nonaqueous electrolyte secondary battery should have the function of preventing more than a certain level of heat generation. A known nonaqueous electrolyte secondary battery having such a function is a battery including a separator having a shutdown function, which is a function of blocking passage of ions between the cathode and the anode with use of a separator in a case where there has been abnormal heat generation. This function can prevent further heat generation.

An example separator having a shutdown function is a porous film made of a material that is meltable by abnormal heat generation. A battery including such a separator is arranged such that abnormal heat generation melts the porous film to make the porous film non-porous and thus block passage of ions, thereby preventing further heat generation.

An example separator having such a shutdown function is a porous film containing a polyolefin as a main component. A polyolefin porous film as a separator is, in a case where there has been abnormal heat generation in the battery, melted at a temperature of approximately 80° C. to 180° C. and made non-porous to block passage of ions, thereby preventing further heat generation. However, in a case where, for example, there has been intense heat generation, a polyolefin porous film as a separator may, for example, contract or break, and let the cathode and the anode come into direct contact with each other, thereby causing a short circuit. A polyolefin porous film as a separator, as described above, has insufficient shape stability and does not necessarily prevent abnormal heat generation resulting from a short circuit.

There have been proposed some nonaqueous electrolyte secondary battery separators that are excellent in shape stability at high temperatures. One of such nonaqueous electrolyte secondary battery separators proposed is a nonaqueous electrolyte secondary battery separator including a laminated porous film that includes a laminate of (i) a heat-resistant layer containing fine particles as a filler and (ii) a porous film containing a polyolefin as a main component (see, for example, Patent Literatures 1 to 3). A nonaqueous electrolyte secondary battery separator including such a laminated porous film is excellent in shape stability and can prevent abnormal heat generation resulting from a short circuit.

CITATION LIST

Patent Literature

[Patent Literature 1]
Japanese Patent Application Publication, Tokukai, No. 2004-227972 A
[Patent Literature 2]
Japanese Patent Application, Tokugan, No. 2012-532397
[Patent Literature 3]
Japanese Patent Application, Tokugan, No. 2006-155745

SUMMARY OF INVENTION

Technical Problem

Nonaqueous electrolyte secondary batteries in recent years each tend to have a larger battery capacity as a result of the battery being larger in size. There is thus a demand that a nonaqueous electrolyte secondary battery should, in a case where it has a large battery capacity, be excellent in safety against internal short circuits caused by penetration of a foreign body (typically, a nail penetration test).

It is an object of the present invention to provide a laminated porous film that in a case where it is included in a nonaqueous electrolyte secondary battery having a large battery capacity, allows the nonaqueous electrolyte secondary battery to be excellent in safety against internal short circuits caused by penetration of a foreign body (typically, a nail penetration test) and that is thus suitable as a nonaqueous electrolyte secondary battery separator.

Solution to Problem

The inventors of the present invention continued to conduct diligent research to attain the above object, and have made the present invention as a result.

Specifically, the present invention may be described as any of <1> to <5> below.

<1> A laminated porous film, including: a porous layer containing a polyolefin; and a porous layer containing a heat-resistant material and provided on at least one surface of the porous layer containing the polyolefin, the laminated porous film satisfying Formula (I) below, $$0.1136 \times \alpha + 0.0819 \times \beta + 3.8034 \geq 4.40 \tag{I},$$

where $\alpha$ is a film resistance ($\Omega \cdot cm^2$) of the laminated porous film, and $\beta$ is a volume ($cc/m^2$) of the heat-resistant material contained per 1 $m^2$ of the porous layer containing the heat-resistant material.

<2> The laminated porous film according to <1>, wherein the laminated porous film satisfies Formula (I-2) below, $$4.90 \geq 0.1136 \times \alpha + 0.0819 \times \beta + 3.8034 \geq 4.40 \tag{I-2},$$

where $\alpha$ is the value of the film resistance ($\Omega \cdot cm^2$) of the laminated porous film, and $\beta$ is the value of the volume ($cc/m^2$) of the heat-resistant material contained per 1 $m^2$ of the porous layer containing the heat-resistant material.

<3> The laminated porous film according to <1> or <2> above, wherein the film resistance a of the laminated porous film is within a range of 0.25 $\Omega \cdot cm^2$ to 5.00 $\Omega \cdot cm^2$.

<4> The laminated porous film according to any one of <1> to <3> above, wherein the heat-resistant material includes a binder and a filler.

<5> The laminated porous film according to <4> above, wherein the filler has a weight proportion within a range of 20% by weight to 99% by weight with respect to 100% by weight of a combination of the binder and the filler.

<6> A nonaqueous electrolyte secondary battery, including a laminated porous film according to any one of <1> to <5> above.

Advantageous Effects of Invention

The present invention allows for production of a laminated porous film that allows a nonaqueous electrolyte secondary battery having a large battery capacity to be excellent in safety against internal short circuits and that is suitable as a nonaqueous electrolyte secondary battery separator.

DESCRIPTION OF EMBODIMENTS

The following description will discuss with the present invention in detail. The present invention is, however, not limited to the embodiment below, and may be modified freely and variously for implementation within the range of the substance of the present invention.

A laminated porous film of the present invention is a porous film including a laminate of (i) a porous layer containing a polyolefin (hereinafter referred to also as "A layer") and (ii) a porous layer containing a heat-resistant material (hereinafter referred to also as "B layer"). The A layer imparts a shutdown function to the laminated porous film, that is, the A layer is, in a case where the battery has generated heat intensely, melted and made non-porous. The B layer is resistant to high temperatures at which the shutdown function is carried out, and allows the laminated porous film to be excellent in shape stability even at high temperatures.

The A layer and the B layer above simply need to be alternately arranged on each other. There may be three or more layers; for example, a B layer may be provided on each surface of the A layer.

In a case where a B layer is provided on each surface of the A layer, the two B layers may contain respective heat-resistant materials different from each other.

(Porous Layer Containing Polyolefin [A Layer])

The following description will discuss the A layer of the laminated porous film of the present invention. The A layer is a porous layer containing a polyolefin. The polyolefin is, for example, a high-molecular-weight homopolymer or copolymer produced through polymerization of ethylene, propylene, 1-butene, 4-methyl-1-pentene, 1-hexene, and/or the like. The A layer may contain (i) a single one of these polyolefins or (ii) a mixture of two or more of the polyolefins.

The A layer preferably contains, among the above polyolefins, a high-molecular-weight polyethylene containing ethylene as a main component.

The A layer contains a polyolefin component at proportion of typically more than 50% by volume, preferably not less than 70% by volume, more preferably not less than 90% by volume, further preferably not less than 95% by volume, of the entire A layer.

The A layer may further contain a component other than a polyolefin as long as that other component does not impair the function of the A layer.

In order to prevent the A layer from being dissolved in the electrolyte solution in a case where the A layer is included in a nonaqueous electrolyte secondary battery as a nonaqueous electrolyte secondary battery separator, (i) the A layer preferably contains a high-molecular-weight component having a weight-average molecular weight within a range of $1 \times 10^5$ to $15 \times 10^6$, and (ii) the polyolefin contained in the A layer preferably has a weight-average molecular weight within the above range.

The A layer has a thickness within a range of typically 4 μm to 50 μm, preferably 5 μm to 30 μm. If the thickness is less than 5 μm, the laminated porous film may have an insufficient strength. If the thickness is more than 50 μm, the laminated porous film may have a large thickness and thus have a small battery capacity (that is, small volume energy density).

The A layer has a porosity within a range of typically 20% by volume to 80% by volume, preferably 30% by volume to 70% by volume.

If the porosity is less than 20% by volume, the battery may only be capable of retaining a decreased amount of electrolyte solution. If the porosity is more than 80% by volume, the laminated porous film may not be made nonporous sufficiently at high temperatures at which the shutdown function is carried out, that is, the laminated porous film may not be capable of blocking a current in a case where the battery has generated heat intensely.

The A layer has a pore size of preferably not more than 3 μm, further preferably not more than 1 μm, to achieve excellent ion permeability and prevent particles from entering the cathode or the anode in a case where the laminated porous film is included in a nonaqueous electrolyte secondary battery as a separator.

The A layer contains pores connected to one another, and allows gas, liquid, or the like to pass therethrough from one surface to the other. The A layer has a transmittance typically indicated as an air permeability. The A layer has an air permeability within a range of typically 30 sec/100 cc to 1000 sec/100 cc, preferably 50 sec/100 cc to 800 sec/100 cc.

The A layer has a volume per unit area within a range of typically 4 g/m$^2$ to 15 g/m$^2$, preferably 5 g/m$^2$ to 12 g/m$^2$. If the volume per unit area is less than 4 g/m$^2$, the laminated porous film may have an insufficient strength. If the volume per unit area is more than 15 g/m$^2$, the laminated porous film may have a large thickness and thus give a small battery capacity.

The A layer may be produced by any method. The A layer may, for example, be produced by (i) a method of adding a plasticizing agent to a thermoplastic resin to shape the thermoplastic resin into a film and then removing the plasticizing agent with use of an appropriate solvent as disclosed in Japanese Patent Application Publication, Tokukaihei, No. 7-29563 A or (ii) selectively drawing a structurally weak amorphous portion of a thermoplastic resin film, produced by a publicly known method, to form micropores as disclosed in Japanese Patent Application Publication, Tokukaihei, No. 7-304110 A. In a case where, for example, the A layer is to be made of a polyolefin resin containing (i) a high-molecular-weight polyethylene having a weight-average molecular weight of more than 1,000,000 and (ii) a low-molecular-weight polyolefin having a weight-average molecular weight of not more than 10,000, the A layer is, in terms of production cost, preferably produced by a method including the following steps:

(a) kneading 100 parts by weight of the high-molecular-weight polyethylene, 5 parts by weight to 200 parts by weight of the low-molecular-weight polyolefin, and 100 parts by weight to 400 parts by weight of an inorganic filler such as calcium carbonate to produce a polyolefin resin composition, (b) shaping the polyolefin resin composition into a sheet, (c) removing the inorganic filler from the sheet produced in the step (b), and (d) drawing the sheet produced in the step (c), to produce an A layer.

(Porous Layer Containing Heat-Resistant Material [B Layer])

The following description will discuss the B layer of the laminated porous film of the present invention. The B layer is a porous layer containing a heat-resistant material. The B layer, which is a porous layer containing a heat-resistant material, allows gas, liquid, or the like to pass therethrough from one surface to the other, and further allows the laminated porous film to have shape stability at high temperatures.

The present specification defines a heat-resistant material as being a material that does not melt or pyrolize at temperatures at which the A layer melts (for example, approximately 130° C. in a case where the A layer is made of polyethylene).

The B layer contains a heat-resistant material component at a proportion of typically more than 50% by volume, preferably not less than 70% by volume, more preferably not less than 90% by volume, further preferably not less than 95% by volume, of the entire solid content of the B layer. The heat-resistant material is, for example, a heat-resistant resin or a heat-resistant composition containing a binder and a filler.

Examples of the heat-resistant resin include polyamide, polyimide, polyamide imide, polycarbonate, polyacetal, polysulfone, polyphenylene sulfide, polyether ether ketone, aromatic polyester, polyether sulfone, and polyetherimide. The B layer may contain (i) a single one of these heat-resistant resins or (ii) a mixture of two or more of the heat-resistant resins.

The heat-resistant resin is, among the above heat-resistant resins, preferably polyamide, polyimide, polyamide imide, polyether sulfone, or polyetherimide, more preferably polyamide, polyimide, or polyamide imide, for a greater heat resistance. The heat-resistant resin is even more preferably a nitrogen-containing aromatic polymer such as aromatic polyamide (for example, para-oriented aromatic polyamide or meta-oriented aromatic polyamide), aromatic polyimide, or aromatic polyamide imide. The nitrogen-containing aromatic polymer is particularly preferably aromatic polyamide. The nitrogen-containing aromatic polymer is, among others, particularly preferably para-oriented aromatic polyamide (hereinafter referred to also as "para-aramid") for easy production.

Para-aramid is obtained by condensation polymerization of para-oriented aromatic diamine and para-oriented aromatic dicarboxylic acid halide, and substantially includes repeating units in which amide bonds are bonded at para positions or corresponding oriented positions (for example, oriented positions that extend coaxially or parallel in opposite directions such as the cases of 4,4'-biphenylene, 1,5-naphthalene, and 2,6-naphthalene) of aromatic rings. Examples of the para-aramid include para-aramids each having a para-oriented structure or a structure corresponding to a para-oriented structure, such as poly(paraphenylene terephthalamide), poly(parabenzamide), poly(4,4'-benzanilide terephthalamide), poly(paraphenylene-4,4'-biphenylene dicarboxylic acid amide), poly(paraphenylene-2,6-naphthalene dicarboxylic acid amide), poly(2-chloroparaphenylene terephthalamide), and paraphenylene terephthalamide/2,6-dichloroparaphenylene terephthalamide copolymer.

The aromatic polyimide is preferably fully aromatic polyimide produced through condensation polymerization of an aromatic diacid anhydride and a diamine. Examples of the diacid anhydride include pyromellitic dianhydride, 3,3',4,4'-diphenyl sulfone tetracarboxylic dianhydride, 3,3',4,4'-benzophenone tetracarboxylic dianhydride, 2,2'-bis(3,4-dicarboxyphenyl)hexafluoropropane, and 3,3',4,4'-biphenyl tetracarboxylic dianhydride. Examples of the diamine include oxydianiline, paraphenylenediamine, benzophenone diamine, 3,3'-methylenedianiline, 3,3'-diaminobenzophenone, 3,3'-diaminodiphenyl sulfone, and 1,5'-naphthalene diamine.

The aromatic polyamide imide is, for example, produced through condensation polymerization of (i) aromatic dicarboxylic acid and aromatic diisocyanate or (ii) aromatic diacid anhydride and aromatic diisocyanate. Examples of the aromatic dicarboxylic acid include isophthalic acid and terephthalic acid. Examples of the aromatic diacid anhydride include trimellitic anhydride. Examples of the aromatic diisocyanate include 4,4'-diphenylmethane diisocyanate, 2,4-tolylene diisocyanate, 2,6-tolylene diisocyanate, ortho tolylene diisocyanate, and m-xylene diisocyanate.

In a case where the heat-resistant material is a heat-resistant resin, the B layer may contain a filler as long as the filler does not impair the function of the B layer. The filler is, for example, any of the fillers described below for the heat-resistant composition. The filler is, among the fillers described below, preferably made of an inorganic oxide, more preferably made of α-alumina among others, to allow the laminated porous film to have increased shape stability at high temperatures.

The binder contained in the heat-resistant composition including a binder and a filler is preferably a polymer that has the property of binding filler particles to each other and binding the A layer and the filler to each other, that is insoluble in the electrolyte solution of the battery, and that is electrochemically stable when the battery is in normal use. The binder may be a water-soluble or water-insoluble polymer. Examples of the binder include: polyolefins such as polyethylene and polypropylene; fluorine-containing resins such as polyvinylidene fluoride and polytetrafluoroethylene; fluorine-containing rubbers such as vinylidene fluoride-hexafluoropropylene-tetrafluoroethylene copolymer and ethylene-tetrafluoroethylene copolymer; rubbers such as styrene-butadiene copolymer and a hydrogenated one thereof, methacrylic acid ester copolymer, acrylonitrile-acrylic acid ester copolymer, styrene-acrylic acid ester copolymer, ethylene propylene rubber, and polyvinyl acetate; resins with a melting point or a glass transition temperature of 180° C. or higher, such as polyphenylene ether, polysulfone, polyether sulfone, polyphenylene sulfide, polyetherimide, polyamide, polyimide, polyamide imide, polyetheramide, and polyester; and polymers such as polyvinyl alcohol, polyethyleneglycol, cellulose ethers, sodium alginate, polyacrylic acid, polyacrylamide, and polymethacrylic acid. The heat-resistant composition may contain (i) a single one of these binders or (ii) a mixture of two or more of the binders.

The binder is, among the above polymers, preferably a water-soluble polymer in terms of process and environmental load. The water-soluble polymer is, among others, preferably carboxy alkyl cellulose, alkyl cellulose, hydroxyalkyl cellulose, starch, polyvinyl alcohol, or sodium alginate, more preferably cellulose ether.

Examples of the cellulose ether include carboxymethyl cellulose (CMC), hydroxyethyl cellulose (HEC), carboxy ethyl cellulose, methyl cellulose, ethyl cellulose, cyan ethyl cellulose, and oxyethyl cellulose.

Among these, CMC and HEC, which have excellent chemical and thermal stability, are preferable, and CMC is more preferable.

The filler may be an organic or inorganic filler. Examples of the organic filler include fine particles made of: (i) a homopolymer of a monomer such as styrene, vinyl ketone, acrylonitrile, methyl methacrylate, ethyl methacrylate, glycidyl methacrylate, glycidyl acrylate, or methyl acrylate, or (ii) a copolymer of two or more of such monomers; fluorine-based resins such as polytetrafluoroethylene, ethylene tetrafluoride-propylene hexafluoride copolymer, tetrafluoroethylene-ethylene copolymer, and polyvinylidene fluoride; melamine resin; urea resin; polyethylene; polypropylene; or polymethacrylate. Examples of the inorganic filler include fine particles made of calcium carbonate, talc, clay, kaolin, silica, hydrotalcite, diatomaceous earth, magnesium carbonate, barium carbonate, calcium sulfate, magnesium sulfate, barium sulfate, aluminum hydroxide, magnesium hydroxide, calcium oxide, magnesium oxide, titanium oxide, alumina, mica, zeolite, or glass.

Alternatively, it is possible to use a material similar to the filler such as a hydrate of the filler. The heat-resistant composition may contain (i) a single one of the above fillers or (ii) a mixture of two or more of the fillers.

Among these fillers, in order to further increase chemical stability and high-temperature shape stability, the filler is preferably made of an inorganic oxide, and more preferably made of α-alumina.

Note that the filler is preferably a filler having sufficient pores to ensure ion permeability of the B layer.

The filler has a weight proportion within a range of typically 20% by weight to 99% by weight, preferably 60% by weight to 99% by weight, with respect to 100% by weight of the binder and the filler combined. In a case where the weight proportion of the filler falls within such a specified range, it is possible to obtain a laminated porous film having an excellent balance between ion permeability and improbability of powder falling. Powder falling is a phenomenon in which a filler is peeled off a deposited porous film.

The B layer may contain a component other than a heat-resistant material as long as the other component does not impair the function of the B layer. Examples of such component include a dispersing agent, a plasticizing agent, and a pH adjusting agent.

The B layer has a thickness within a range of typically 1 µm to not more than 25 µm, preferably 5 µm to not more than 20 µm. If the thickness is less than 1 µm, in a case where an accident or the like has caused the battery to generate heat, the separator may not be able to withstand thermal contraction of the A layer and may thus contract. If the thickness is more than 25 µm, the laminated porous film may have a large thickness and thus give a small battery capacity.

In the case where a B layer is provided on each surface of the A layer, the respective thicknesses of the two B layers are combined to mean the "thickness of the B layer".

A B layer can be formed on a surface of an A layer by, for example, (i) a method of producing an A layer and a B layer separately and laminating the two layers produced or (ii) a method of applying a coating solution containing a heat-resistant material to a surface of an A layer to form a B layer. The latter method is, however, preferable because it is easier and simpler.

In the case where the heat-resistant material is a heat-resistant resin, a coating solution containing the heat-resistant material can be applied to a surface of an A layer to form a B layer by, for example, a method including the following steps (hereinafter referred to also as "method 1"):

(a) preparing either a polar organic solvent solution containing a heat-resistant resin dissolved in a polar organic solvent or a slurry containing a filler dispersed in a polar organic solvent solution in which a heat-resistant resin is dissolved;

(b) applying the polar organic solvent solution or slurry to a surface of an A layer to form a coating film; and (c) separating out the heat-resistant resin from the coating film by, for example, moisturization, solvent elimination, or immersion into a solvent that does not dissolve the heat-resistant resin and as necessary drying the heat-resistant resin.

In a case where the heat-resistant resin is aromatic polyamide (aramid), the polar organic solvent in the polar organic solvent solution can be a polar amide solvent or polar urea solvent. Examples of the polar amide solvent or polar urea solvent include N,N-dimethylformamide, N,N-dimethylacetamide, N-methyl-2-pyrrolidone (NMP), and tetramethylurea.

In a case where the heat-resistant resin is a para-aramid, a chloride of an alkali metal or alkali earth metal is preferably added during polymerization for production of the para-aramid to improve the solubility of the para-aramid in the solvent. Specific examples of the chloride include, but are not limited to, lithium chloride and calcium chloride. The above chloride is added to the polymerization system in an amount within a range of preferably 0.5 mole to 6.0 moles, further preferably 1.0 mole to 4.0 moles, per 1.0 mole of the amide group produced through condensation polymerization. If the chloride is added in an amount of less than 0.5 mole, the para-aramid produced may have insufficient solubility. If the chloride is added in an amount of more than 6.0 moles, that amount may substantially exceed the solubility of the chloride in the solvent, which is not preferable. Typically, if the chloride of an alkali metal or alkali earth metal is added in an amount of less than 2% by weight, the para-aramid may have insufficient solubility. If the chloride is added in an amount of more than 10% by weight, the chloride may not be dissolved in the polar organic solvent such as a polar amide solvent or polar urea solvent.

In a case where the heat-resistant resin is aromatic polyimide, the aromatic polyimide can be suitably dissolved in a polar organic solvent such as dimethylsulfoxide, cresol, or o-chlorophenol in addition to the example solvents above in which aramid is dissolved.

In a case where the heat-resistant material is a heat-resistant composition, a coating solution containing the heat-resistant material can be applied to a surface of an A layer to form a B layer by, for example, a method including the following steps (hereinafter referred to also as "method 2"):

(a) preparing a slurry containing a binder, a filler, and a medium;

(b) applying the slurry to a surface of an A layer to form a coating film; and (c) removing the medium.

The medium (that is, a solvent or disperse medium) simply needs to be capable of dissolving or dispersing a component for the heat-resistant material uniformly and stably. Specific examples of the medium include water, alcohols such as methanol, ethanol, and isopropanol, acetone, toluene, xylene, hexane, N-methylpyrrolidone, N,N-dimethylacetamide, and N,N-dimethylformamide. The medium may be (i) a single one of these mediums or (ii) a mixture of a plurality of the mediums as long as the plurality of the mediums are dissolved in each other. In particular, in terms of process or environmental load, it is preferable for the medium to contain water at 80% or more by weight, more preferably contain only water.

In a case where the medium contains water, it is preferable to perform a hydrophilization treatment on the A layer before the slurry is applied to the A layer. Performing a hydrophilization treatment on the A layer further improves the application property, and allows production of a more homogeneous B layer. A hydrophilization treatment is particularly effective in a case where the medium contains water at a high concentration.

The A layer may be subjected to a hydrophilization treatment by any method. Specific examples of the hydrophilization treatment include (i) a chemical treatment involving an acid, an alkali, or the like, (ii) a corona treatment, and (iii) a plasma treatment.

A corona treatment is advantageous as it can not only hydrophilize the A layer within a relatively short time period, but also reform the polyolefin through corona discharge only at a surface and its vicinity of the A layer and leave the inside of the A layer unchanged in quality while ensuring high coating easiness.

The medium in the slurry applied to the A layer is removed typically by drying. The medium may alternatively be removed by (i) preparing a solvent that is dissolved in the medium and that does not dissolve the resin used, (ii) immersing, in the solvent, a film that has been formed by the application of the slurry and that has not been dried to substitute the medium with the solvent and separate out the resin, (iii) removing the medium, and (iv) removing the solvent by drying. In a case where the slurry liquid is applied to a surface of the A layer, the medium or solvent is preferably dried at a temperature that does not change the air permeability of the A layer.

The slurry liquid may contain, for example, a surface active agent, a pH adjusting agent, a dispersing agent, and/or a plasticizing agent as long as the present invention can attain its objects.

In methods 1 and 2, the polar organic solvent solution or slurry is applied to the A layer by any conventionally publicly known method as long as the method allows for uniform wet coating. Examples of the method include a capillary coating method, a spin coating method, a slit die coating method, a spray coating method, a roll coating method, a screen printing method, a flexographic printing method, a bar coater method, a gravure coater method, and a die coater method. The thickness of a B layer to be formed can be controlled by adjusting (i) the amount of the polar organic solvent solution or slurry to be applied, (ii) the concentration of the binder in the polar organic solvent solution or slurry, and/or (iii) for the slurry, the ratio of the filler to the binder. It is possible to use, as a support, a resin film, a metal belt, a drum, or the like.

In methods 1 and 2, the polar organic solvent solution or slurry may be prepared by any method as long as the method allows for preparation of a homogeneous polar organic solvent solution or slurry. In a case of slurry, in particular, it is preferable to use a method such as mechanical stirring method, ultrasonic dispersion method, high-pressure dispersion method, or media dispersion method, and it is more preferable to use high-pressure dispersion method because it allows the slurry to be easily dispersed more uniformly. The mixing order during such an operation may be any order as long as it causes no particular problem such as generation of precipitate.

(Laminated Porous Film)

A laminated porous film of the present invention is a laminated porous film including a laminate of (i) a porous layer containing a polyolefin and (ii) on at least one surface thereof, a porous layer containing a heat-resistant material, the laminated porous film satisfying Formula (I) below, preferably Formula (I-2) below.

$$0.1136 \times \alpha + 0.0819 \times \beta + 3.8034 \geq 4.40 \tag{I},$$

$$4.90 \geq 0.1136 \times \alpha + 0.0819 \times \beta + 3.8034 \geq 4.40 \tag{I-2},$$

where $\alpha$ is the film resistance ($\Omega \cdot cm^2$) of the laminated porous film, and $\beta$ is the volume ($cc/m^2$) of the heat-resistant material contained per 1 $m^2$ of the porous layer containing a heat-resistant material.

A nonaqueous electrolyte secondary battery including as a nonaqueous electrolyte secondary battery separator a laminated porous film that satisfies Formula (I) above has a 50% breakdown voltage of not less than 4.40 V during a nail penetration test and is excellent in safety against internal short circuits even in a case where the battery capacity is large. This is presumably for the following reason:

As described below, the inventors of the present invention have studied lithium ion secondary batteries each including a laminated porous film to learn about safety of a nonaqueous electrolyte secondary battery against internal short circuits, and have consequently discovered that the 50% breakdown voltage during a nail penetration test is correlated with (i) the film resistance ($\Omega \cdot cm^2$) of the laminated porous film and (ii) the volume per unit area of the heat-resistant material contained in the B layer, that is, the volume ($cc/m^2$) of the heat-resistant material contained per 1 $m^2$ of the porous layer containing a heat-resistant material.

First, the 50% breakdown voltage is correlated with the film resistance of the laminated porous film as represented by Formula (II) below. A larger film resistance of the laminated porous film results in less likelihood of a current flowing in a case where an internal short-circuit has occurred.

$$50\% \text{ breakdown voltage} = 0.1136 \times \alpha + 3.941 \tag{II},$$

where $\alpha$ is the film resistance ($\Omega \cdot cm^2$) of the laminated porous film.

Next, the 50% breakdown voltage is correlated with the volume of the heat-resistant material contained per 1 $m^2$ of the porous layer containing a heat-resistant material as represented by Formula (III) below. A larger volume of the heat-resistant material results in less likelihood of a current flowing in a case where an internal short-circuit has occurred.

$$50\% \text{ breakdown voltage} = 0.0819 \times \beta + 3.899 \tag{III}$$

where $\beta$ is the volume ($cc/m^2$) of the heat-resistant material contained per 1 $m^2$ of the porous layer containing a heat-resistant material.

Further, the 50% breakdown voltage can be represented by Formula (IV) below on the basis of Formulae (II) and (III) above.

$$50\% \text{ breakdown voltage} = 0.1136 \times \alpha + 0.0819 \times \beta + \gamma \tag{IV},$$

where $\alpha$ is the film resistance ($\Omega \cdot cm^2$) of the laminated porous film, β is the volume ($cc/m^2$) of the heat-resistant material contained per 1 $m^2$ of the porous layer containing a heat-resistant material, and γ is a constant.

The constant γ in Formula (IV) above is calculated to be found at 3.8034 on the basis of the actual value described later of the 50% breakdown voltage and the respective actual values described later of α and β. The result of the calculation of the constant γ allows for derivation of Formula (V) below on the basis of Formula (IV) above.

$$50\% \text{ breakdown voltage} = 0.1136 \times \alpha + 0.0819 \times \beta + 3.8034 \quad (V)$$

where

α is the film resistance ($\Omega \cdot cm^2$) of the laminated porous film, and β is the volume ($cc/m^2$) of the heat-resistant material contained per 1 $m^2$ of the porous layer containing a heat-resistant material.

A laminated porous film of the present invention is arranged such that the right-hand side of Formula (V) above is calculated to give not less than 4.40, that is, the laminated porous film satisfies Formula (I) above. A nonaqueous electrolyte secondary battery including the laminated porous film as a nonaqueous electrolyte secondary battery separator thus has a 50% breakdown voltage of not less than 4.40 V. Such a nonaqueous electrolyte secondary battery, even in a case where the battery voltage is as large as not less than 4.40 V and the battery capacity is large, prevents abnormal heat generation resulting from an internal short circuit, that is, has excellent safety against internal short circuits.

The laminated porous film has a film resistance within a range of typically 0.25 $\Omega \cdot cm^2$ to 5.00 $\Omega \cdot cm^2$, preferably not more than 2 $\Omega \cdot cm^2$, in terms of battery characteristics (ion permeability and load characteristic). If the film resistance is less than 0.25 $\Omega \cdot cm^2$, the laminated porous film may, although having excellent ion permeability, have a higher risk of a minute short circuit occurring. If the film resistance is more than 2.00 $\Omega \cdot cm^2$, the laminated porous film may not have good ion permeability and thus have degraded battery characteristics. If the film resistance is more than 5.00 $\Omega \cdot cm^2$, the laminated porous film may have significantly degraded battery characteristics. For a larger film resistance, both or either of the A layer and the B layer simply needs to have a larger thickness and/or a lower porosity, for example. For a smaller film resistance, both or either of the A layer and the B layer simply needs to have a smaller thickness and/or a higher porosity.

The heat-resistant material contained in the B layer of the laminated porous film has a volume per unit area (that is, the volume of the heat-resistant material contained per 1 $m^2$ of the porous layer containing a heat-resistant material) within a range of typically 0.5 $cc/m^2$ to 20 $cc/m^2$, preferably not less than 1 $cc/m^2$, more preferably not less than 5 $cc/m^2$, in terms of stability on heating and battery characteristics. The volume per unit area is preferably not more than 15 $cc/m^2$, more preferably not more than 10 $cc/m^2$. The volume per unit area is preferably within a range of 1 $cc/m^2$ to 10 $cc/m^2$. If the volume per unit area is less than 0.5 $cc/m^2$, the laminated porous film may be more likely to break on heating. If the volume per unit area is more than 20 $cc/m^2$, the laminated porous film may have a large thickness and thus give a smaller battery capacity. If the volume per unit area is not less than 5 $cc/m^2$, the laminated porous film will have a sufficiently lower risk of breaking on heating. If the volume per unit area is not more than 15 $cc/m^2$, the laminated porous film will have a sufficiently smaller thickness and thus have a lower risk of having a smaller battery capacity. For a larger volume per unit area, the slurry for formation of the B layer simply needs to have a higher solid concentration and/or be discharged in a larger amount for coating, for example. For a smaller volume per unit area, the slurry for formation of the B layer simply needs to have a lower solid concentration and/or be discharged in a smaller amount for coating, for example.

In the case where a B layer is provided on each surface of the A layer, the respective volumes per unit area of the two B layers are combined to mean the "volume per unit area of the B layer".

The laminated porous film as a whole (the A layer and the B layer combined) has a thickness within a range of typically 5 μm to 75 μm, preferably 10 μm to 50 μm. If the thickness of the laminated porous film as a whole is less than 5 μm, the laminated porous film may be more likely to break. If the thickness of the laminated porous film as a whole is more than 50 μm, the laminated porous film may have a large thickness, and the battery may thus have a smaller capacity (volume energy density). If the thickness of the laminated porous film as a whole is more than 75 μm, the battery may have a significantly smaller capacity.

The laminated porous film has an air permeability within a range of typically 50 sec/100 cc to 2000 sec/100 cc, preferably 70 sec/100 cc to 1000 sec/100 cc. If the air permeability is more than 2000 sec/100 cc, the laminated porous film may have impaired battery characteristics (ion permeability and load characteristic).

A laminated porous film of the present invention may include a porous layer as, for example, an adhesive layer or a protective layer in addition to the A layer and the B layer as long as the present invention can attain its objects.

(Nonaqueous Electrolyte Secondary Battery)

The following description will discuss a nonaqueous electrolyte secondary battery of the present invention. A nonaqueous electrolyte secondary battery of the present invention includes a laminated porous film of the present invention as a separator. The nonaqueous electrolyte secondary battery includes (i) a cathode, (ii) an anode, (iii) a separator sandwiched between respective surfaces of the cathode and the anode which surfaces face each other, and (iv) a nonaqueous electrolyte solution. The following description will discuss individual constituent elements of a nonaqueous electrolyte secondary battery of the present invention for an example case in which the battery is a nonaqueous electrolyte secondary battery such as a lithium battery. The nonaqueous electrolyte secondary battery is, however, not limited to the example case.

The nonaqueous electrolyte solution is, for example, a nonaqueous electrolyte solution prepared by dissolving a lithium salt in an organic solvent. The lithium salt is, for example, a single one or mixture of two or more of $LiClO_4$, $LiPF_6$, $LiAsF_6$, $LiSbF_6$, $LiBF_4$, $LiCF_3SO_3$, $LiN(SO_2CF_3)_2$, $LiC(SO_2CF_3)_3$, $Li_2B_{10}Cl_{10}$, lower aliphatic carboxylic acid lithium salt, and $LiAlCl_4$. The lithium salt preferably includes at least one selected from the group consisting of, among the above lithium salts, $LiPF_6$, $LiAsF_6$, $LiSbF_6$, $LiBF_4$, $LiCF_3SO_3$, $LiN(CF_3SO_2)_2$, and $LiC(CF_3SO_2)_3$, each of which contains fluorine.

Examples of the nonaqueous electrolyte solution include carbonates such as propylene carbonate, ethylene carbonate, dimethyl carbonate, diethyl carbonate, ethyl methyl carbonate, 4-trifluoromethyl-1,3-dioxolane-2-one, and 1,2-di (methoxy carbonyloxy)ethane; ethers such as 1,2-dimethoxyethane, 1,3-dimethoxypropane, pentafluoropropyl methylether, 2,2,3,3-tetrafluoropropyl difluoro methylether, tetrahydrofuran, and 2-methyl tetrahydrofuran; esters such as methyl formate, methyl acetate, and Y-butyrolactone; nitriles such as acetonitrile and butyronitrile; amides such as N,N-dimethylformamide and N,N-dimethylacetamide; carbamates such as 3-methyl-2-oxazolidone; sulfur-containing compounds such as sulfolane, dimethyl sulfoxide, and 1,3-propane sultone; and any of the above substances that contains a fluorine group introduced therein. The nonaqueous electrolyte solution is typically a mixture of two or more of the above substances.

The nonaqueous electrolyte solution, among the above examples, preferably contains a carbonate, further preferably a mixture of a cyclic carbonate and an acyclic carbonate or a mixture of a cyclic carbonate and an ether. The mixture of a cyclic carbonate and an acyclic carbonate is preferably a mixture containing ethylene carbonate, dimethyl carbonate, and ethyl methyl carbonate because such a mixture has a wide operating temperature range and is not easily decomposed even in a case where the anode contains, as an active material, a graphite material such as natural graphite or artificial graphite.

The cathode typically includes (i) a mix containing a cathode active material, a conductive agent, and a binder and (ii) a current collector supporting the mix. Specifically, the cathode can include (i) as a cathode active material, a material capable of being doped and dedoped with lithium ions, (ii) as a conductive agent, a carbonaceous material, and (iii) as a binder, a thermoplastic resin, for example. The material capable of being doped and dedoped with lithium ions is, for example, a lithium complex oxide containing at least one transition metal such as V, Mn, Fe, Co, or Ni. Preferable among these are (i) a lithium complex oxide having an $\alpha$-NaFeO$_2$ structure such as lithium nickelate and lithium cobaltate and (ii) a lithium complex oxide having a spinel structure such as lithium manganese spinel, both of which have a high average discharge potential.

The lithium complex oxide may contain any of various metallic elements. In particular, the complex lithium nickelate preferably contains at least one metallic element selected from the group consisting of Ti, V, Cr, Mn, Fe, Co, Cu, Ag, Mg, Al, Ga, In, and Sn at a proportion of 0.1 to 20 mol % with respect to the sum of (i) the number of moles of the at least one metallic element and (ii) the number of moles of Ni in the lithium nickelate. This is because such a complex lithium nickelate allows for an improved cycle characteristic for use in a high-capacity battery.

Examples of the binder include thermoplastic resins such as polyvinylidene fluoride, a copolymer of vinylidene fluoride, polytetrafluoroethylene, a tetrafluoroethylene-hexafluoropropylene copolymer, a tetrafluoroethylene-perfluoroalkyl vinyl ether copolymer, an ethylene-tetrafluoroethylene copolymer, a vinylidene fluoride-hexafluoro propylene-tetrafluoroethylene copolymer, a thermoplastic polyimide, polyethylene, and polypropylene.

The conductive agent is, for example, a carbonaceous material such as natural graphite, artificial graphite, coke, or carbon black. The conductive material may be (i) a single one of the above examples or (ii) a mixture of artificial graphite and carbon black, for example.

Examples of the anode include (i) a material capable of being doped and dedoped with lithium ions, (ii) a lithium metal, and (iii) a lithium alloy. The material capable of being doped and dedoped with lithium ions is, for example, a carbonaceous material such as natural graphite, artificial graphite, coke, carbon black, pyrolytic carbon, carbon fiber, and fired product of an organic polymer compound; and a chalcogen compound such as an oxide or sulfide doped and dedoped with lithium ions at an electric potential lower than that for the cathode. The carbonaceous material preferably contains a graphite material such as natural graphite or artificial graphite as a main component because such a carbonaceous material has high electric potential flatness and low average discharge potential and can thus be combined with a cathode to achieve high energy density.

Examples of the anode current collector include Cu, Ni, and stainless steel, among which Cu is preferable because Cu is not easily alloyed with lithium in the case of a lithium secondary battery and is easily processed into a thin film. A mix containing the anode active material can be supported by the anode current collector by, for example, a method of pressure molding or by a method of pasting the mix with use of a solvent or the like, applying the paste onto the current collector, drying the paste applied, and pressure-bonding the dried product by, for example, pressing the dried product.

The battery of the present invention is not limited to any particular shape, and may have, for example, a sheet shape, a coin shape, a cylinder shape, or an angular shape.

The laminated porous film of the present invention is suitable as a separator of a battery, in particular a nonaqueous electrolyte secondary battery. A nonaqueous electrolyte secondary battery including the laminated porous film of the present invention, even in a case where the nonaqueous electrolyte secondary battery has a large battery capacity, prevents abnormal heat generation resulting from an internal short circuit caused by nail penetration and has excellent safety against internal short circuits.

Further, a nonaqueous electrolyte secondary battery of the present invention will also be excellent in terms of (i) safety such as overcharge property and impact resistance and (ii) battery characteristics such as load characteristic.

EXAMPLE

The following description will discuss the present invention in greater detail. The present invention is, however, not limited to the details below.

The physical properties and the like of a laminated porous film were measured by the methods below.

(1) Thickness (Unit: μm)

The thickness of a laminated porous film (total thickness) was measured with use of a high-precision digital measuring machine produced by Mitutoyo Corporation. A laminated porous film was cut to prepare a square with an 8-cm side, and a five-point measurement was made of the square. The thickness was determined from the mean value of the measurements.

The thickness of an A layer (A layer thickness) was determined by measurements made by a method similar to the above. The thickness of a B layer (B layer thickness) was determined by subtracting the A layer thickness from the thickness of the laminated porous film.

(2) Volume Per Unit Area of Heat-Resistant Material ($\beta$, Unit: cc/m$^2$)

A square with a side of 0.08 m was cut out as a sample from a laminated porous film, and the weight W (g) of the sample cut out was measured. Similarly, a square with a side of 0.08 m was cut out as a sample from the polyolefin porous film (A layer), and the weight Wa (g) of the sample cut out was measured. Then, Wa was subtracted from W to calculate the weight Wb (g)(=W−Wa) of the B layer. Next, the calculated weight Wb (g) of the B layer was divided by the true specific gravity D (g/cc) of the heat-resistant material and the area S (m$^2$)(=0.08×0.08) of the cutout of the laminated porous film to calculate the volume per unit area of the heat-resistant material, that is, the volume of the heat-resistant material contained per 1 m² of the porous layer containing a heat-resistant material(=Wb/(D×S)).

(3) Air Permeability (Unit: sec/100 cc)

The air permeability of a laminated porous film was measured with use of a digital Oken-type air permeability tester of Asahi Seiko Co., Ltd. in conformity with JIS P8117.

(4) Film Resistance ($\alpha$, Unit: $\Omega \cdot cm^2$) of Laminated Porous Film Six circular measurement samples each having a diameter of 17 mm and 24 circular measurement samples each having a diameter of 15 mm were cut out as measurement samples from a laminated porous film. Further, members of a 2032-type coin cell were prepared (namely, a top cover, a bottom cover, a gasket, two spacers [circular spacers each having a diameter of 15.5 mm and a thickness of 0.5 mm], and a waved washer) (purchased from Hohsen Corporation).

First, a glove box was filled with argon gas and set to have a dew point temperature of not higher than −80° C. In this glove box, one of the spacers, measurement samples, and the other spacer were placed on top of one another on the bottom cover in that order from the bottom cover side.

The number of measurement samples placed between the spacers was two, five, or eight. Two cells each including two measurement samples, two cells each including five measurement samples, and two cells each including eight measurement samples were prepared. In each cell, one of the plurality of measurement samples was a circular measurement sample having a diameter of 17 mm, whereas the other circular measurement sample(s) had a diameter of 15 mm. The gasket was so placed as to fix the circular measurement sample having a diameter of 17 mm, and the waved washer was placed on the spacer. Next, into each cell with the waved washer placed thereon, an electrolyte solution (produced by Kishida Chemical Co., Ltd.) was injected in which a mixed solvent of ethylene carbonate (EC), dimethyl carbonate (DMC), and ethyl methyl carbonate (EMC) (EC:DMC: EMC=30:35:35 [volume ratio]) was mixed with $LiPF_6$ and which had a concentration of 1 M. After the injection, the cell was left to stand under a pressure of approximately −80 kPa for 10 minutes to allow the electrolyte solution to permeate the measurement samples. Then, a top cover was placed on the cell, and was hermetically sealed with use of a coin cell calker. This produced sample cells.

The sample cells produced were each placed in a 25° C. thermostat bath, and left as it was for 24 hours. Then, the resistance of the cell was measured with use of an alternating-current impedance measuring device at an amplitude of 5 mV and a frequency within the range of 1 MHz to 10 kHz. The value measured of the resistance component of the cell (that is, the value on the real axis with respect to the value of 0 on the imaginary axis) was plotted against the number of laminated porous films included in the cell, and the plot was linearly approximated to find the slope. This slope was multiplied by the area of each spacer (1.88 cm²(=(1.55 cm/2)²×π), the product of which was used as the film resistance of each laminated porous film ($\Omega \cdot cm^2$).

(5) Nail Penetration Test (50% Breakdown Voltage, Unit: V)

Ten cylindrical lithium ion secondary batteries were each charged to have a specific test voltage. Then, a nail having a $\phi$ of 2.77 mm was inserted at a central portion of the battery at a rate of 1 mm/sec for a nail penetration test, and safety at the voltage was evaluated. In this evaluation, a battery was rated as P (poor) in a case where there had been abnormal heat generation or as G (good) in a case where abnormal heat generation had been prevented. The ten lithium ion secondary batteries were subjected to the nail penetration test through the procedure below.

(a) One lithium ion secondary battery was subjected to a nail penetration test at a test voltage.

(b) Another lithium secondary battery was subjected to a nail penetration test at (i) a test voltage which was 0.05 V higher than that for the nail penetration test in (a) in a case where the battery was rated as G (good) in the nail penetration test in (a) or at (ii) a test voltage which was 0.05 V lower than that for the nail penetration test in (a) in a case where the battery was rated as P (poor) in the nail penetration test in (a).

(c) Still another lithium secondary battery was subjected to a nail penetration test at (i) a test voltage which was 0.05 V higher than that for the nail penetration test in (b) in a case where the battery was rated as G (good) in the nail penetration test in (b) or at (ii) a test voltage which was 0.05 V lower than that for the nail penetration test in (b) in a case where the battery was rated as P (poor) in the nail penetration test in (b).

(d) The remaining seven lithium ion secondary batteries were each sequentially subjected to a nail penetration test at a test voltage set as in (c). The nail penetration test was performed on each of the ten cylindrical lithium ion secondary batteries. The nail penetration test in (a) had a test voltage (initial test voltage) selected within the range of 3.8 V to 4.4 V.

With reference to the test results, the 50% breakdown voltage of the lithium ion secondary battery was calculated by a method similar to the method specified in "JIS K 7211: General rules for a method of a drop-weight impact test for rigid plastic". The 50% breakdown voltage calculated means a battery voltage for a nonaqueous electrolyte secondary battery that prevents abnormal heat generation resulting from an internal short circuit caused by nail penetration. In a case where the battery voltage of a nonaqueous electrolyte secondary battery in which an internal short circuit has been caused by nail penetration is not more than the 50% breakdown voltage, abnormal heat generation is prevented. The 50% breakdown voltage is expressed by the equation below.

$$V_{50}=VI+d[\Sigma(i \cdot ni)/N \pm \tfrac{1}{2}],$$

where $V_{50}$ is a 50% breakdown voltage,

VI is the test voltage for a case in which the voltage level (i) is 0 (that is, a test voltage for which some batteries are rated as G (good) and the rest of the batteries, which are larger in number than those rated as G (good), are rated as P (poor)), d is a voltage difference (V) by which the test voltage is raised or lowered, i is a voltage level increased or decreased by one (1) (i= . . . −3, −2, −1, 0, 1, 2, 3 . . . ), the voltage level being 0 in a case of VI (for example, with d=0.05 V, i=1 in a case where the test voltage is raised by 0.05 V from VI, and i=−1 in a case where the test voltage is lowered by 0.05 V from VI), ni is the number of batteries that were rated as G (good) (or P (poor)) in nail penetration tests at each voltage level, N is the total number of batteries that were rated as G (good) (or P (poor)) in all nail penetration tests (N=Σni), (Regarding which one of the number (total number) of batteries that were rated as G (good) and the number (total number) of batteries that were rated as P (poor) is to be used, the number of (i) batteries that were rated as G (good) is used if the number of such batteries is larger than the number of batteries that were rated as P (poor) or the number of (ii)

batteries that were rated as P (poor) is used if the number of such batteries is larger than the number of batteries that were rated as G (good). If the numbers were equal, either number may be used.), and ±½ is (i)+½ in a case where ni and N each indicate the number (total number) of batteries that were rated as G (good) or (ii) −½ in a case where ni and N each indicate the number (total number) of batteries that were rated as P (poor).

Comparative Example 1

<Preparation of Slurry for Formation of B Layer>

Carboxymethyl cellulose (CMC) (1110 [produced by Daicel FineChem Ltd.], true specific gravity: 1.6 g/cm$^3$) and alumina powder (AKP3000 [produced by Sumitomo Chemical Co., Ltd.], true specific gravity: 4.0 g/cm$^3$) were added at a weight ratio of 3:100 to a medium containing pure water and isopropyl alcohol at a weight ratio of 90:10, and were mixed with the medium so that the solid content concentration was 28% by weight. The mixture was then subjected to high-pressure dispersion. This prepared slurry for formation of the B layer.

<Production of A Layer>

High-molecular-weight polyethylene powder (GUR4032 [produced by Ticona Corporation]) and polyethylene wax having a weight-average molecular weight of 1000 (FNP-0115 [produced by Nippon Seiro Co., Ltd.]) were prepared. Into the combination (100 parts by weight) of the high-molecular-weight polyethylene (70% by weight) and the polyethylene wax (30% by weight), 0.4 part by weight of an antioxidant (Irg1010 [produced by CIBA Specialty Chemicals Inc.]), 0.1 part by weight of an antioxidant (P168 [produced by CIBA Specialty Chemicals Inc.]), and 1.3 parts by weight of sodium stearate were added. Further, calcium carbonate having an average particle size of 0.1 μm (produced by Maruo Calcium Co., Ltd.) was added at 38% by volume with respect to the total volume. These were mixed in a Henschel mixer in the form of powder, and were melted and kneaded in a biaxial kneading machine. This prepared a polyolefin resin composition. The polyolefin resin composition was rolled with use of a pair of rolls each having a surface temperature of 150° C. This prepared a sheet. Another sheet was prepared by a similar method that used a different drawing rate during rolling. These two sheets were thermocompressed at 130° C. to provide a laminated sheet. This sheet was immersed in a hydrochloric acid aqueous solution (containing 4 mol/L of hydrochloric acid and 0.5% by weight of a nonionic surfactant) for removal of the calcium carbonate. Then, the sheet was extended at 105° C. and a certain scaling factor to provide a polyolefin porous film (A layer) having a specific thickness.

<Production of Laminated Porous Film>

The slurry for formation of the B layer was (i) directly applied with use of a gravure coater to a surface of the A layer that had been subjected to a corona treatment and was (ii) dried. This produced a laminated porous film that included an A layer and a B layer placed on a surface of the A layer and that had a specific thickness. Table 1 shows the physical properties of the laminated porous film produced which properties were measured by the above methods. Table 1 also shows the result of calculating the value of "0.1136×α+0.0819×β+3.8034" for the laminated porous film produced.

Comparative Examples 2, 3, 5, 6, and 9

Operations similar to that of Comparative Example 1 were carried out except that the A layer thicknesses, the B layer thicknesses, and the total thicknesses were as shown in Table 1 to produce laminated porous films each including an A layer and a B layer placed on a surface of the A layer. Table 1 shows the physical properties of each laminated porous film produced which properties were measured by the above methods. Table 1 also shows the result of calculating the value of "0.1136×α+0.0819×β+3.8034" for each laminated porous film produced.

Comparative Example 4

An operation similar to that of Comparative Example 1 was carried out except that the slurry for formation of the B layer was (i) directly applied with use of a gravure coater to each surface of the A layer that had been subjected to a corona treatment and was (ii) dried. This produced a laminated porous film that included an A layer and B layers placed on both the respective surfaces of the A layer and that had a specific thickness. Table 1 shows the physical properties of the laminated porous film produced which properties were measured by the above methods. Table 1 also shows the result of calculating the value of "0.1136×α+0.0819×β+3.8034" for the laminated porous film produced.

Comparative Examples 7 and 8

Operations similar to that of Comparative Example 4 were carried out except that the A layer thicknesses, the B layer thicknesses, and the total thicknesses were as shown in Table 1 to produce laminated porous films each including an A layer and B layers placed on both the respective surfaces of the A layer. Table 1 shows the physical properties of each laminated porous film produced which properties were measured by the above methods. Table 1 also shows the result of calculating the value of "0.1136×α+0.0819×β+3.8034" for each laminated porous film produced.

Example 1

An operation similar to that of Comparative Example 4 was carried out except that the A layer was a commercially available polyolefin porous film and that the A layer thickness, the B layer thickness, and the total thickness were as shown in Table 1. This produced a laminated porous film including an A layer and B layers placed on both the respective surfaces of the A layer. Table 1 shows the physical properties of the laminated porous film produced which properties were measured by the above methods. Table 1 also shows the result of calculating the value of "0.1136×α+0.0819×β+3.8034" for the laminated porous film produced.

Comparative Example 10

<Synthesis of Para-Aramid>

Para-aramid (poly(paraphenylene terephthalamide)) was produced with use of a 3-liter separable flask having a stirring blade, a thermometer, a nitrogen entry tube, and a powder addition opening. Specifically, 2200 g of N-methyl-2-pyrrolidone (NMP) was charged into the flask, which had been sufficiently dried. Then, 151.07 g of calcium chloride powder vacuum-dried at 200° C. for 2 hours was added. The flask was heated to 100° C. to completely dissolve the calcium chloride in the NMP. The resulting calcium chloride solution was cooled to room temperature, and 68.23 g of paraphenylenediamine was added and completely dissolved. While the resulting solution was kept at 20° C.±2° C., 124.97 g of terephthalic acid dichloride was added in ten separate portions at intervals of approximately 5 minutes. Then, the resulting solution was stirred and kept at 20° C.±2° C. to be aged for 1 hour. This produced a para-aramid solution having a para-aramid concentration of 6% by weight.

<Preparation of Slurry for Formation of the B Layer>

First, 243 g of NMP was added to 100 g of the para-aramid solution produced, and the resulting solution was stirred for 60 minutes. This produced a para-aramid solution having a para-aramid concentration of 1.75% by weight. Further, 6 g of alumina powder (alumina C [produced by Nippon Aerosil Co., Ltd.], true specific gravity: 3.2 g/cm$^3$) was mixed with 6 g of alumina powder (Advanced Alumina AA-03 [produced by Sumitomo Chemical Co., Ltd.], true specific gravity: 4.0 g/cm$^3$) to provide 12 g of an alumina powder mixture. Then, the alumina powder mixture (12 g) was mixed with the para-aramid solution (with a para-aramid concentration of 1.75% by weight), and the resulting mixture was stirred for 240 minutes. This produced an alumina powder-containing para-aramid solution. This alumina powder-containing para-aramid solution was then filtered through a 1000-mesh wire net. Next, 0.73 g of calcium oxide was added to the filtrate. The resulting mixture was stirred for 240 minutes for neutralization, and was degassed under reduced pressure. This produced slurry for formation of the B layer.

<Production of A Layer>

An operation similar to that of Comparative Example 1 was carried out to produce a polyolefin porous film (A layer) having a specific thickness.

<Production of Laminated Porous Film>

A roll of the A layer (with a width of 300 mm and a length of 300 m) was attached to a wind-off device. While the A layer was being pulled out from the wind-off device, the slurry for formation of the B layer was applied to a surface of the A layer to continuously produce a laminated porous film.

Specifically, first, NMP was applied with use of a microgravure coater to a lower surface of the A layer pulled out, while the slurry for formation of the B layer was applied with use of a bar coater to an upper surface of the A layer so that the slurry would have a specific thickness. Then, the resulting A layer was passed through a vessel having a constant temperature and humidity (with a temperature of 50° C. and a relative humidity of 70%) so that para-aramid would be separated out from the coating films. These films were then passed through a water washing device (which was structured to (i) include a vessel into which ion-exchange water was to be injected at 10 liter/min and from which the ion-exchange water inside filling the vessel was to be discharged at the same rate as the injection and (ii) be provided with guide rolls set inside the vessel). This removed the NMP and the calcium chloride from the A layer.

Next, the washed A layer was, while hot air was being blown to the A layer with use of a yankee dryer, passed between heated rolls (each having a diameter of 1 m and a surface temperature of 70° C. and covered by a canvas made of meta-aramid cloth) for drying to remove the moisture content. This produced a laminated porous film that included an A layer and a B layer placed on a surface of the A layer and that had a specific thickness. Table 1 shows the physical properties of the laminated porous film produced which properties were measured by the above methods.

Table 1 also shows the result of calculating the value of "$0.1136 \times \alpha + 0.0819 \times \beta + 3.8034$" for the laminated porous film produced.

Comparative Example 11

First, an operation similar to that of Comparative Example 10 was carried out to produce a laminated porous film including an A layer and a B layer placed on a surface of the A layer. Then, another B layer was formed through an operation similar to that of Comparative Example 1 on the other surface of the A layer of the laminated porous film produced. This produced a laminated porous film including an A layer and B layers placed on both the respective surfaces of the A layer, one of the B layers containing para-aramid and the other containing CMC. Table 1 shows the physical properties of the laminated porous film produced (which included an A layer and B layers placed on both the respective surfaces of the A layer) which properties were measured by the above methods. Table 1 also shows the result of calculating the value of "$0.1136 \times \alpha + 0.0819 \times \beta + 3.8034$" for the laminated porous film produced.

Reference Example 1

An estimation was made of a film resistance ($\alpha$) for a case in which the thickness of each B layer (heat-resistant layer: both surfaces, binder CMC) of Comparative Example 4 was increased to achieve a total thickness of 50 μm. Then, the value of "$0.1136 \times \alpha + 0.0819 \times \beta + 3.8034$" was calculated.

The per-unit-area volume F of each heat-resistant layer per film thickness can be represented by the formula below, where $T_B$ is the film thickness of each B layer (heat-resistant layer), and $\beta$ is the volume per unit area.

$$F = \beta / T_B$$

For each of Comparative Examples 4, 7, and 8, which involved similar laminated arrangements, F was calculated on the basis of $T_B$ and $\beta$ as follows:

| | |
|---|---|
| $F = 0.470$ cc/m$^2$/μm | Comparative Example 4: |
| $F = 0.479$ cc/m$^2$/μm | Comparative Example 7: |
| $F = 0.473$ cc/m$^2$/μm | Comparative Example 8: |

The mean value Fave. of the three Fs above was 0.474 cc/m$^2$/μm.

The film resistance value U per volume per unit area of each B layer is represented by the formula below, where $\Delta\alpha$ is the film resistance difference between two experimental results, and $\Delta\beta$ is the difference in the volume per unit area between the B layers.

$$U = \Delta\alpha / \Delta\beta$$

For each of Comparative Examples 4, 7, and 8, which involved similar laminated arrangements, U was calculated on the basis of the difference between $\alpha$ and $\beta$ as follows:

| | |
|---|---|
| $U = 0.081$ Ω·cm$^2$·m$^2$/cc | Difference between Comparative Examples 4 and 7: |
| $U = 0.101$ Ω·cm$^2$·m$^2$/cc | Difference between Comparative Examples 4 and 8: |
| $U = 0.072$ Ω·cm$^2$·m$^2$/cc | Difference between Comparative Examples 7 and 8: |

The mean value Uave. of the three Us above was 0.085 Ω·cm$^2$·m$^2$/cc.

Since the total film thickness for Comparative Example 4 was 26.3 μm, producing a separator having a total thickness of 50 μm would require adding a B layer having a thickness of 23.7 μm. Adding a B layer having a thickness of 23.7 μm would mean an increase in the volume per unit area which increase was 23.7 μm×Fave.=23.7 μm×0.474 cc/m²/μm=11.23 cc/m² as calculated from the above result.

In a case where another heat-resistant layer was placed on the separator produced in Comparative Example 4 for a total thickness of 50 μm, the film resistance was calculated from the above result as follows: Uave.×11.23 cc/m²+1.02 Ω·cm²=0.085 Ω·cm²·m²/cc×11.23 cc/m²+1.02 Ω·cm²=1.97 Ω·cm².

Therefore, the value of "0.1136×α+0.0819×β+3.8034" for a laminated porous film having a film resistance (a) of A film thickness increase for a case in which a volume per unit area of 4.71 cc/m² was added was calculated from Fave. above as 4.71 cc/m²/Fave.=9.9 μm. In other words, the total thickness was calculated at 30.2 μm+9.9 μm=40.1 μm.

The value of "0.1136×α+0.0819×β+3.8034" for a laminated porous film having a film resistance (a) of 2.00 Ω·cm² and a volume per unit area (β) of 6.35 cc/m²+4.71 cc/m²=11.06 cc/m² was calculated to give 4.94. Table 1 shows the result.

TABLE 1

| | Heat-resistant composition | | Laminated arrangement *1 | A layer tkn | B layer tkn *2 | Total tkn *3 | Fil resistance (α) | Volume per unit area (β) *4 | Air permeability | Calculating result for laminated porous film *5 |
|---|---|---|---|---|---|---|---|---|---|---|
| | Binder | Filler | | μm | μm | μm | Ω·cm² | cc/m² | sec/100 cc | |
| CE 1 | CMC | Alumina | A layer/B layer | 15.7 | 3.8 | 19.5 | 0.91 | 1.06 | 108 | 4.04 |
| CE 2 | CMC | Alumina | A layer/B layer | 17.0 | 3.6 | 20.6 | 2.35 | 1.10 | 595 | 4.21 |
| CE 3 | CMC | Alumina | A layer/B layer | 14.4 | 4.0 | 18.4 | 0.46 | 1.05 | 45 | 3.99 |
| CE 4 | CMC | Alumina | B layer/A layer/B layer | 17.2 | 9.1 | 26.3 | 1.02 | 4.28 | 127 | 4.27 |
| CE 5 | CMC | Alumina | A layer/B layer | 15.4 | 2.4 | 17.8 | 0.93 | 1.04 | 112 | 3.99 |
| CE 6 | CMC | Alumina | A layer/B layer | 15.8 | 6.0 | 21.8 | 0.95 | 2.72 | 114 | 4.13 |
| CE 7 | CMC | Alumina | B layer/A layer/B layer | 16.6 | 5.1 | 21.7 | 0.88 | 2.46 | 117 | 4.10 |
| CE 8 | CMC | Alumina | B layer/A layer/B layer | 16.8 | 7.9 | 24.7 | 0.97 | 3.74 | 111 | 4.22 |
| CE 9 | CMC | Alumina | A layer/B layer | 12.7 | 3.7 | 16.4 | 1.05 | 1.81 | 245 | 4.07 |
| CE 10 | Para-aramid | Alumina | A layer/B layer | 15.8 | 3.3 | 19.1 | 1.06 | 1.17 | 204 | 4.02 |
| CE 11 | Para-aramid/CMC | Alumina | B layer/A layer/B layer | 16.1 | 9.9 | 26.0 | 1.30 | 4.21 | 256 | 4.30 |
| Ex 1 | CMC | Alumina | B layer/A layer/B layer | 18.5 | 11.7 | 30.2 | 1.60 | 6.35 | 393 | 4.51 |
| RE 1 | CMC | Alumina | B layer/A layer/B layer | 17.2 | 32.8 | 50.0 | 1.97 | 15.51 | — | 5.30 |
| RE 2 | CMC | Alumina | B layer/A layer/B layer | 18.5 | 21.6 | 40.1 | 2.00 | 11.06 | — | 4.94 |

"CE" stands for "Comparative Example".
"Ex" stands for "Example".
"RE" stands for "Reference Example".
"tkn" stands for "thickness".
*1 A layer/B layer: an A layer and a B layer placed on a surface of the A layer. B layer/A layer/B layer: an A layer and B layers placed on both the respective surfaces of the A layer.
*2 In a case where B layers are placed on both the respective surfaces of an A layer, "B layer thickness" refers to the combined thickness of both B layers.
*3 Total thickness: A layer thickness + B layer thickness.
*4 In a case where a B layer is provided on each surface of the A layer, "Volume per unit area of the B layer" refers to the combination of the respective volumes per unit area of the two B layers
*5 The calculation results each show a value calculated by 0.1136 × α + 0.0819 × β + 3.8034.

1.97 Ω·cm² and a volume per unit area (β) of 4.28 cc/m²+11.23 cc/m²=15.51 cc/m² was calculated to give 5.30. Table 1 shows the result.

Reference Example 2

The value of "0.1136×α+0.0819×β+3.8034" was calculated for a case in which the thickness of each B layer (heat-resistant layer: both surfaces, binder CMC) of Example 1 was increased to achieve a film resistance (α) of 2 Ω·cm².

Since the film resistance (a) for Example 1 was 1.60 Ω·cm², producing a separator having a film resistance (α) of 2 Ω·cm² would require a film resistance increase of 0.4 Ω·cm². A film resistance increase of 0.4 Ω·cm² requires an increase of the volume per unit area of the B layers of 4.71 cc/m², which is calculated from 0.4 Ω·cm²/Uave with use of Uave. above.

(Nail Penetration Test)
<Preparation of Cathode>

A cathode active material, a conductive agent, a binder 1, a binder 2, and water were used. Specifically, a cathode active material (CELLSEED C-10N [produced by Nippon Chemical Industrial Co., Ltd.], LiCoO₂, true specific gravity: 4.8 g/cm³), a conductive agent (acetylene black [produced by Denki Kagaku Kogyo Kabushiki Kaisha], true specific gravity: 2.2 g/cm³), a binder 1 (PTFE31-JR [produced by Du Pont-Mitsui Fluorochemicals Co., Ltd.], true specific gravity: 2.2 g/cm³), and a binder 2 (Serogen 4H [produced by Dai-Ichi Kogyo Seiyaku Co., Ltd.], true specific gravity: 1.4 g/cm³) were weighed out for a composition having a mixing ratio of 92:2.7:4.55:0.75 (weight ratio). An amount of water was put into a kneader, and the binder 2 was dissolved in the water. Then, the cathode active material, the conductive agent, and the binder 1 were added, and the ingredients were kneaded. Next, water was added again so that the viscosity would be 2700±1000 cp. This prepared a cathode mix. This cathode mix was applied to a portion of each of both surfaces of an aluminum foil having a thickness of 20 μm, having no void, and serving as a cathode current collector sheet. The cathode mix applied was then dried. After that, the resulting product was rolled with use of a roll pressing machine until the coated film had a thickness of 140 μm (apparent density of 3.5 g/cm$^3$). This produced a cathode having a width of 54 mm.

<Preparation of Anode>

An anode active material 1, an anode active material 2, a binder, and water were used. Specifically, an anode active material 1 (BF15SP [produced by Chuetsu Graphite Works Co., Ltd.], true specific gravity: 2.2 g/cm$^3$), an anode active material 2 (CG-R-A [produced by Nippon Graphite Industries, Co., Ltd.], true specific gravity: 2.2 g/cm$^3$), and a binder (Serogen 4H [produced by Dai-Ichi Kogyo Seiyaku Co., Ltd.], true specific gravity: 1.4 g/cm$^3$) were weighed out for a composition having a mixing ratio of 58.8:39.2:2 (weight ratio). An amount of water was put into a kneader, and the binder was dissolved in the water. Then, the anode active material 1 and the anode active material 2 were added, and the ingredients were kneaded. Next, water was added again so that the viscosity would be 2100±500 cp. This prepared an anode mix. This anode mix was applied to a portion of each of both surfaces of a copper foil having a thickness of 12 μm, having no void, and serving as an anode current collector sheet. The anode mix applied was then dried. After that, the resulting product was rolled with use of a roll pressing machine until the coated film had a thickness of 140 μm (apparent density of 1.45 g/cm$^3$). This produced an anode having a width of 56 mm.

<Production of Lithium Ion Secondary Battery>

The respective laminated porous films of Comparative Examples 1 through 11 above (each with a width of 60 mm and a length of 700 mm) were each used as a separator. Further, the above cathode (with a width of 54 mm and a length of 560 mm) to which a cathode tab (aluminum) had been welded and the above anode (with a width of 56 mm and a length of 600 mm) to which an anode tab (nickel) had been welded were used. The cathode, the laminated porous film, and the anode were placed on top of one another in that order, and were rolled up. The electrodes produced were each put into a battery can for a 18650 cylindrical battery, and the battery can was necked with use of a bench lathe. Then, the anode tab was welded to the bottom of the can, whereas the cathode tab was welded to the lid of the can. The battery can was then vacuum-dried. Next, 5 g of a nonaqueous electrolyte (produced by Kishida Chemical Co., Ltd., specific gravity: 1.21 g/cm$^3$) (corresponding to 1.1 times the total volume of the voids in the cathode, the anode, and the laminated porous film) containing 1.3 mol/L of LiPF$_6$ salt in a carbonate solvent was injected into the battery can in a glove box having an argon gas atmosphere. The battery can was then hermetically sealed with use of a calker. This produced a lithium ion secondary battery (18650 cylindrical battery). The cylindrical lithium ion secondary battery produced was subjected to a nail penetration test by the above method for calculation of the 50% breakdown voltage. Table 2 shows the result.

(Cyclic Test)

<Preparation of Nonaqueous Electrolyte Secondary Battery>

(Preparation of Cathode)

Six parts by weight of acetylene black and 4 parts by weight of polyvinylidene difluoride (manufactured by Kureha Corporation) were added to and mixed with 90 parts by weight of LiNi1/3Mn1/3Co1/3O$_2$ serving as a cathode active material, so that a mixture was obtained. The mixture was dispersed in N-methyl-2-pyrrolidone, so that a slurry was prepared. The slurry obtained was uniformly applied to a part of aluminum foil serving as a cathode current collector, and the slurry was dried. Thereafter, the aluminum foil was rolled with use of a pressing machine so as to have a thickness of 80 μm. Next, the rolled aluminum foil was cut off to be a cathode so that a part in which no cathode active material layer was provided and which had a width of 13 mm was left around a part in which a cathode active material layer was provided and which had a size of 40 mm×35 mm. The cathode active material layer had a density of 2.50 g/cm$^3$.

(Preparation of Anode)

One hundred parts by weight of an aqueous solution of carboxymethyl cellulose, which aqueous solution had a concentration of carboxymethyl cellulose of 1% by weight and served as a thickener and a binding agent, and 1 parts by weight of an aqueous emulsion of styrene-butadiene rubber were added to and mixed with 98 parts by weight of graphite powder serving as an anode active material, so that a slurry was prepared. The slurry obtained was applied to a part of rolled copper foil serving as an anode current collector and having a thickness of 20 μm, and the slurry was dried. Thereafter, the rolled copper foil was rolled with use of a pressing machine so as to have a thickness of 80 μm. Next, the rolled copper foil thus rolled was cut off to be an anode so that a part in which no anode active material layer was provided and which had a width of 13 mm was left around a part in which an anode active material layer was provided and which had a size of 50 mm×40 mm. The anode active material layer had a density of 1.40 g/cm$^3$.

(Preparation of Nonaqueous Electrolyte Secondary Battery)

The cathode, the laminated porous film, and the anode were laminated (placed) in that order in a laminate pouch so that (i) the B layer of the laminated porous film and the cathode active material layer of the cathode were in contact with each other and (ii) the A layer (or the B layer in a case where B layers were formed on both the respective surfaces of the A layer) of the laminated porous film and the anode active material layer of the anode were in contact with each other. A nonaqueous electrolyte secondary battery member was thus obtained. In this case, the cathode and the anode were placed so that a principal surface in the cathode active material layer of the cathode was entirely included in a range of (overlapped with) a principal surface in the anode active material layer of the anode.

Subsequently, the nonaqueous electrolyte secondary battery member was put in a bag made by laminating an aluminum layer and a heat seal layer, and 0.25 mL of a nonaqueous electrolyte solution was poured into the bag. The above nonaqueous electrolyte solution was prepared by dissolving LiPF$_6$ in a mixed solvent of ethylene carbonate, ethyl methyl carbonate, and diethyl carbonate at a ratio of 3:5:2 (volume ratio) so that the LiPF$_6$ would be contained at 1 mol/L. The bag was heat-sealed while a pressure inside the bag was reduced, so that a nonaqueous electrolyte secondary battery was produced.

<Cyclic Test>

A new nonaqueous electrolyte secondary battery which had not been subjected to any cycle of charge/discharge was subjected to four cycles of initial charge/discharge. Each cycle of the initial charge/discharge was constant current charging/discharging performed under conditions that the temperature was 25° C., the voltage range was 4.1 V to 2.7 V, and the current value was 0.2 C (1 C is defined as a value of a current at which a rated capacity based on a discharge capacity at 1 hour rate is discharged for 1 hour. The same is applied hereinafter).

Subsequently, the nonaqueous electrolyte secondary battery was subjected to 100 cycles of charging/discharging, with each cycle being constant current charging/discharging performed under conditions that the temperature was 25° C., the voltage range was 4.2 V to 2.7 V, and the current value was 1.0 C.

The discharge capacity (that is, the quantity of electricity available in a case where a nonaqueous electrolyte secondary battery in a charged state was discharged) during charging/discharging in the first cycle of the above 100 cycles of charging/discharging (that is, charging/discharging performed in the first cycle subsequent to the four cycles of initial charging/discharging) was used as a reference. The ratio of the discharge capacity (discharge capacity in the one-hundredth cycle of the above 100 cycles of charging/discharging) in the one-hundredth cycle of the above 100 cycles of charging/discharging with respect to the reference discharge capacity (discharge capacity in the first cycle) was calculated as a capacity maintenance rate (%) on the basis of the formula below.

Capacity maintenance rate=(discharge capacity in the one-hundredth cycle/discharge capacity in the first cycle)×100

The capacity maintenance rate calculated was rated as G (good) if the capacity maintenance rate was not less than 50% or as P (poor) if the capacity maintenance rate was less than 50%.

The above cyclic test was performed on nonaqueous electrolyte secondary batteries so produced as to include respective laminated porous films prepared in Comparative Examples 2 and 11 and Example 1. Table 2 shows the results.

TABLE 2

|  | 50% breakdown voltage (V) | Cyclic test |
|---|---|---|
| Comparative Example 1 | 4.04 | — |
| Comparative Example 2 | 4.21 | P |
| Comparative Example 3 | 4.00 | — |
| Comparative Example 4 | 4.23 | — |
| Comparative Example 5 | 4.01 | — |
| Comparative Example 6 | 4.12 | — |
| Comparative Example 7 | 4.05 | — |
| Comparative Example 8 | 4.14 | — |
| Comparative Example 9 | 4.04 | — |
| Comparative Example 10 | 4.02 | — |
| Comparative Example 11 | 4.35 | G |
| Example 1 | 4.47 | G |

For a viewpoint of the volume energy density of the battery, the film thickness of the separator is preferably not more than 50 µm. For a viewpoint of battery characteristics, the film resistance of the separator is preferably not more than 2 Ω·cm. These results show that in a case where the value of "0.1136×α+0.0819×+3.8034" is within the range of 4.40 to 4.90, the separator produced is safe against internal short circuits (safety against nail penetration), has good battery characteristics, and allows for high volume energy density of the battery.

INDUSTRIAL APPLICABILITY

The present invention allows for production of (i) a laminated porous film that allows a nonaqueous electrolyte secondary battery having a large battery capacity to be excellent in safety against internal short circuits and that is suitable as a nonaqueous electrolyte secondary battery separator and (ii) a nonaqueous electrolyte secondary battery including the laminated porous film.

The invention claimed is:

1. A laminated porous film, comprising:
a porous layer containing a polyolefin; and
a porous layer containing a heat-resistant material and provided on one or both surfaces of the porous layer containing the polyolefin,
the laminated porous film satisfying Formula (I) below, $$0.1136\times\alpha+0.0819\times\beta+3.8034\geq 4.40 \qquad (I),$$

where
α is a value of a film resistance (Ω·cm$^2$) of the laminated porous film, and
β is a value of a volume (cc/m$^2$) of the heat-resistant material contained per 1 m$^2$ of the porous layer containing the heat-resistant material,
wherein the value α is within a range of 0.25 Ω·cm$^2$ to 2.00 Ω·cm$^2$,
wherein the value β is within a range of 5 cc/m$^2$ to 10 cc/m$^2$,
wherein the porous layer containing the polyolefin has a thickness within a range of 5 µm to 30 µm,
wherein the porous layer containing the heat-resistant material has a thickness within a range of 1 µm to 20 µm,
wherein the laminated porous film has an air permeability within a range of 50 sec/100 cc to 2000 sec/100 cc,
wherein the heat resistant-material is contained at a proportion of more than 50% by volume based on an entire solid content of the porous layer,
wherein the heat-resistant material includes a binder and filler, the binder being a water-soluble polymer,
wherein the filler has a proportion of 20% by weight to 99% by weight with respect to the combined weight of the binder and the filler, and
wherein the filler is made of alumina.

2. The laminated porous film according to claim 1, wherein
the laminated porous film satisfies Formula (I-2) below, $$4.90\geq 0.1136\times\alpha+0.0819\times\beta+3.8034\geq 4.40 \qquad (I-2).$$

3. A nonaqueous electrolyte secondary battery, comprising
a laminated porous film according to claim 1.

4. The laminated porous film according to claim 1, wherein the water-soluble polymer is a carboxy alkyl cellulose, an alkyl cellulose, a hydroxyalkyl cellulose, starch, polyvinyl alcohol, or sodium alginate.

* * * * *